United States Patent
Cloarec

(10) Patent No.: US 7,850,430 B2
(45) Date of Patent: Dec. 14, 2010

(54) TURBOMACHINE ROTOR BLADE

(75) Inventor: Yvon Cloarec, Ecuelles (FR)

(73) Assignee: SNECMA, Paris (FR)

( * ) Notice: Subject to any disclaimer, the term of this patent is extended or adjusted under 35 U.S.C. 154(b) by 798 days.

(21) Appl. No.: 11/835,117

(22) Filed: Aug. 7, 2007

(65) Prior Publication Data
US 2008/0050245 A1 Feb. 28, 2008

(30) Foreign Application Priority Data
Aug. 25, 2006 (FR) .................................. 06 07510

(51) Int. Cl.
*F01D 5/30* (2006.01)
(52) U.S. Cl. ..................................... 416/248
(58) Field of Classification Search ............. 416/219 R, 416/220 R, 248
See application file for complete search history.

(56) References Cited

U.S. PATENT DOCUMENTS

| 2,755,063 | A | * | 7/1956 | Wilkinson | .................. 416/221 |
| 3,853,425 | A | | 12/1974 | Scalzo et al. | |
| 4,502,841 | A | * | 3/1985 | Kebedjis | .................. 416/220 R |
| 5,758,487 | A | * | 6/1998 | Salt et al. | ...................... 60/806 |
| 7,530,791 | B2 | * | 5/2009 | Douville et al. | ......... 416/220 R |

FOREIGN PATENT DOCUMENTS

FR        2 324 873        4/1977

* cited by examiner

*Primary Examiner*—Ninh H Nguyen
(74) *Attorney, Agent, or Firm*—Oblon, Spivak, McClelland, Maier & Neustadt, L.L.P.

(57) ABSTRACT

A turbomachine rotor blade comprising a root (14) mounted in a channel of the periphery of a disk and held by an annular flange (18) which presses on the root (14) of the blade (12), this root comprising a stop (44) engaging in a matching cavity of the flange in order to stop it rotating about the axis of the disk, the central portion of the stop having a thickness less than that of the ends of the stop.

8 Claims, 3 Drawing Sheets

TURBOMACHINE ROTOR BLADE

The present invention relates to a rotor blade, in particular for a compressor of a turbomachine such as an aircraft turbojet or turboprop.

BACKGROUND OF THE INVENTION

The blades of a compressor stage comprise roots engaged in axial channels of the periphery of a rotor disk and held by an annular flange formed of several sectors that is mounted via an external annular rim in an internal annular groove of the downstream face of the disk. This flange presses axially at its radially external end on the downstream ends of the blade roots, and at its radially internal end on the downstream face of the disk by means of an annular sealing snap-ring.

The internal annular rim of the groove of the disk and the annular rim of the flange are scalloped or crenellated in a matching manner, which makes it possible to bring the flange inside the annular groove of the disk by axial translation when the solid portions of the scalloped rim of the flange are in line with the hollow portions of the scalloped rim of the annular groove. The flange is then axially locked by rotation in the annular groove of the disk until the solid portions of the scalloped rim of the flange are in line with the solid portions of the scalloped rim of the annular groove of the disk and are axially pressing on the latter.

The blades comprise stops that are formed on downstream faces of their roots and that are designed to be engaged with a slight circumferential clearance between adjacent solid portions of the annular rim of the flange in order to stop the flange rotating in the annular groove of the disk. Each stop has an elongated shape in the circumferential direction and extends from one lateral edge to the other of the downstream face of the blade root, the lateral ends of the stop interacting by abutment with the adjacent solid portions of the scalloped rim of the flange in order to stop it rotating. This stop is formed by a large volume of material which significantly adds weight to the blade and hence the rotor disk.

DESCRIPTION OF THE PRIOR ART

It has already been proposed to reduce the weight of the rotor blades by reducing the length of their stops in the circumferential direction. However, this solution is not satisfactory because it makes it necessary in consequence to modify the scalloped rim of the flange, by increasing the circumferential extent of the solid portions of its rim, in order to retain the aforementioned slight circumferential clearance between the stops and the solid portions of the rim of the flange, which also leads to an increase in the weight of the flange and hence of the rotor disk.

SUMMARY OF THE INVENTION

The object of the present invention is in particular to provide a simple, effective and economic solution to these problems.

Accordingly it proposes a turbomachine rotor blade comprising a root having a stop formed in protrusion on one of its upstream and downstream end faces, wherein the central portion of this stop has a thickness in a direction substantially perpendicular to said end surface that is less than that of the ends of the stop.

The ends of the stop have a thickness determined by their function of abutment on solid portions of the rim of the flange, and the central portion of this stop may have a much lesser thickness, even zero, without adversely affecting the stopping of rotation of the flange.

The invention therefore makes it possible to reduce the weight of the rotor blades without, for all that, modifying the scalloped rim of the flange because the circumferential distance between the lateral ends of the stops remains unchanged.

The slight thickness of the central portion of the stop also has no effect on the seal of the assembly because this seal is provided by the radially external portion of the flange pressing on the blade roots and by an annular snap-ring mounted between the radially internal portion of the flange and the disk.

The central portion of each stop may be lightened by the removal of material. Preferably, it is removed by machining. This central portion has, for example, a length in a direction substantially perpendicular to the longitudinal axis of the blade and parallel to said end face that is at least equal to approximately ¾ or ⅘ of the length of the stop.

The root of the blade has, for example, a dovetail or dog-tooth shape in cross section. The stop of the blade may be formed by machining or obtained by casting. As a variant, it may be fitted and attached by welding, riveting, screwing, bonding, etc., onto the blade root.

The invention also relates to a turbomachine rotor disk comprising blades as described above whose roots are mounted in channels of the periphery of the disk and an annular flange that is mounted coaxially on the disk and that presses on the roots of the blades, the stop of each blade root being engaged in a matching cavity of the flange in order to stop it rotating about the axis of the disk.

The invention also relates to a turbomachine, such as an aircraft turbojet or turboprop, which comprises at least one rotor disk as described above.

BRIEF DESCRIPTION OF THE DRAWINGS

Other advantages and features of the invention will appear on reading the following description made as a nonlimiting example and with reference to the appended drawings in which.

DESCRIPTION OF THE PREFERRED EMBODIMENTS

Reference is made first to FIGS. 1 to 4 which illustrate the technique involved in the present invention.

Figure 1:
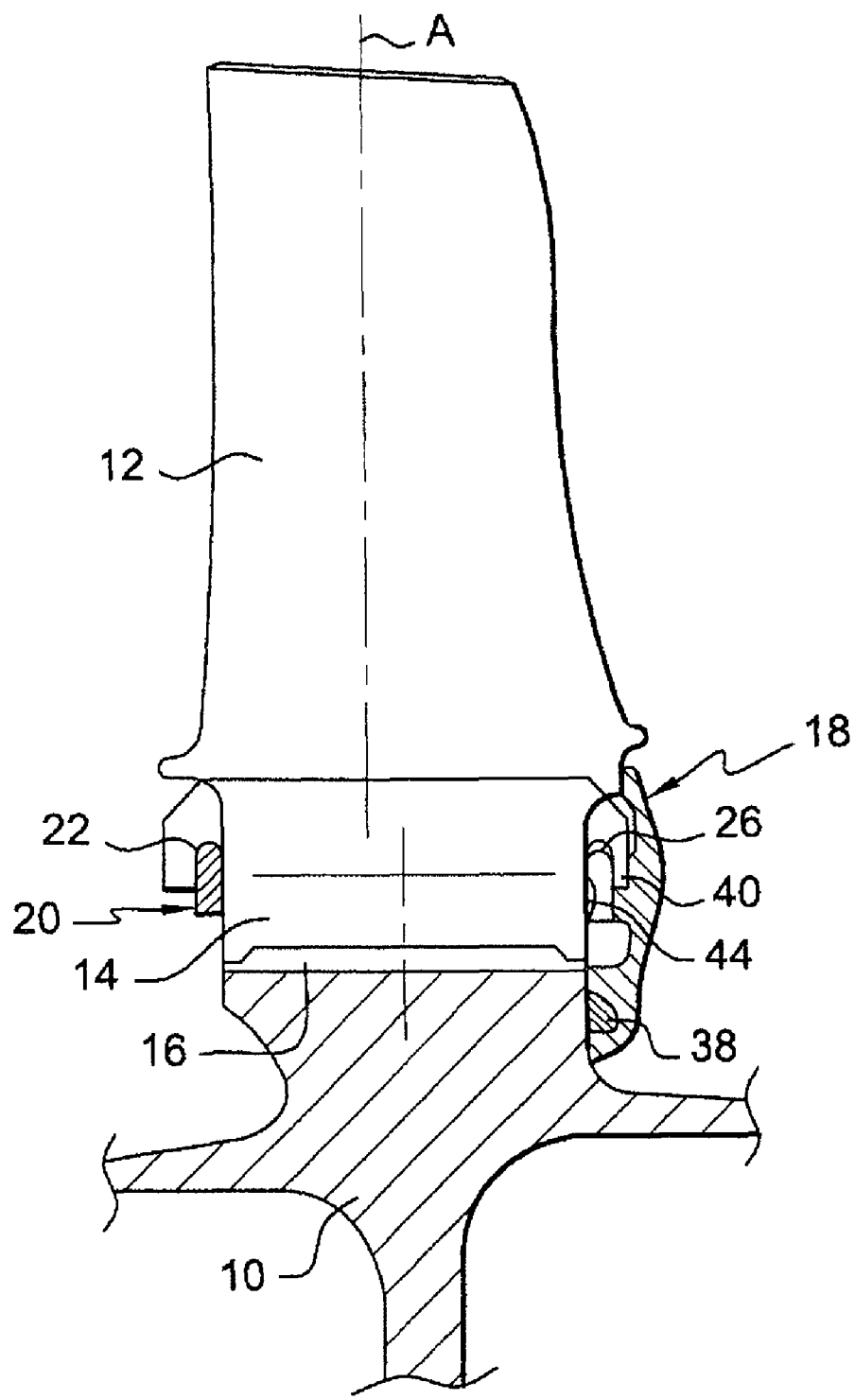
FIG. 1 is a partial schematic view in axial section of a turbomachine rotor disk.
Figure 3:
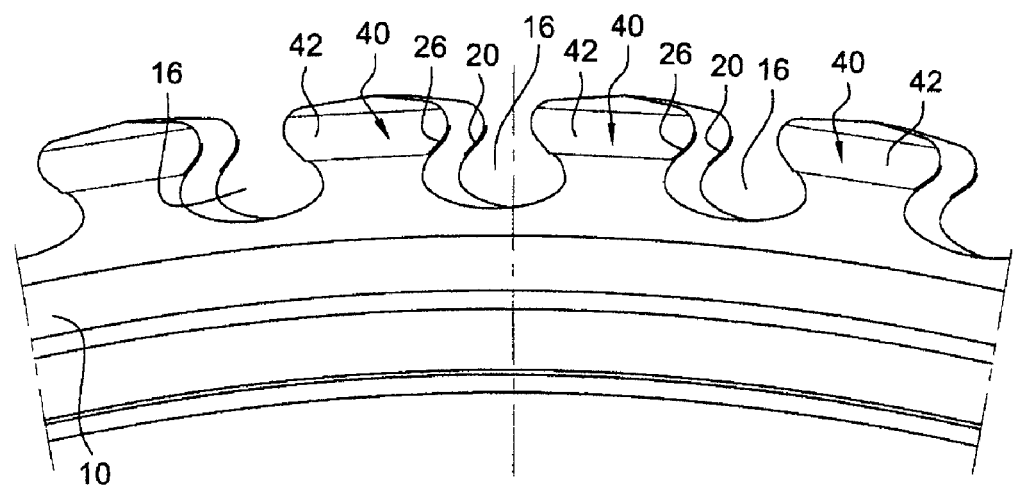
FIG. 3 is a partial schematic view in perspective of the rotor disk of FIG. 1, seen from downstream.

The rotor of a turbomachine compressor comprises a plurality of rotor disks, one of which is shown partially in FIGS. 1 and 3, each disk 10 supporting a plurality of substantially radial blades 12 whose roots 14 are engaged in axial channels 16 of the periphery of the disk 10.

The roots 14 of the blades are retained radially in the channels 16 of the disk by interaction of shapes, these channels 16 being for example dovetailed as shown in FIG. 3. The blades 12 are immobilized axially in the channels 16 by an annular flange 18 mounted on the downstream face of the disk 10 and by a locking ring 20 mounted on the upstream face of the disk.

The locking ring 20 is split and is radially compressed in order to be inserted into an annular groove 22 opening radially toward the inside of the upstream face of the disk 10. This ring 20 presses axially on the upstream ends of the roots 14 of the blades of the disk 10, thereby ensuring that they are axially retained in the upstream direction.

Figure 2:
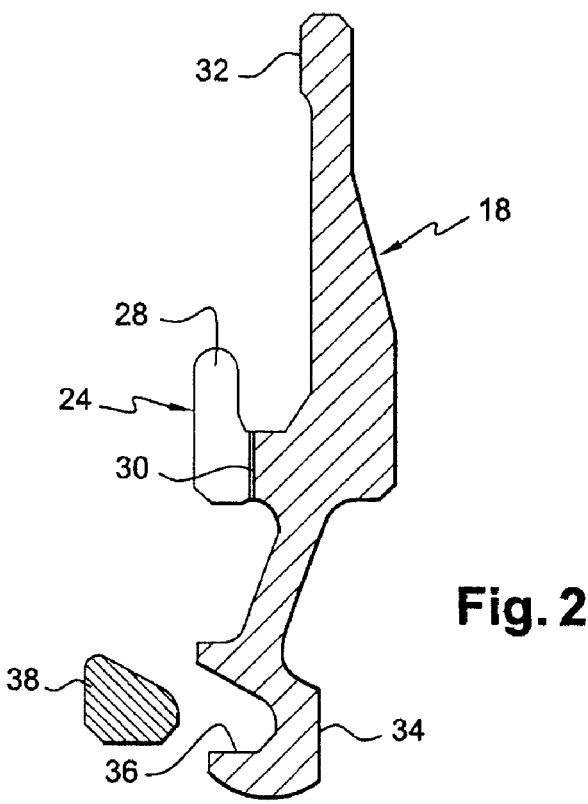
FIG. 2 is a schematic half-view in axial section of the annular flange of the rotor disk of FIG. 1, on a larger scale.

The annular flange 18, more visible in FIG. 2, is formed of angular sectors, for example five in number, and comprises upstream an annular rim 24 oriented radially toward the outside and housed in an annular groove 26 opening radially toward the inside of the downstream face of the disk 10. The annular rim 24 of the flange is scalloped or crenellated, that is to say that it has solid portions 28 formed alternately with hollow portions 30 evenly distributed about the axis of the flange.

The radially external portion 32 of the flange 18 presses axially on the downstream ends of the roots 14 of the blades of the disk 10, thereby ensuring that they are retained axially in the downstream direction.

The annular flange 18 comprises, in its radially internal portion 34, an annular groove 36 opening axially upstream for the housing of an annular sealing snap-ring 38 designed to be clamped axially between the downstream face of the disk and the bottom of the groove 36 and to be deformed radially outward in operation under the effect of the centrifugal forces.

The internal annular rim 40 of the groove 26 of the disk is scalloped or crenellated like the annular rim 24 of the flange 18, which makes it possible to engage the rim 24 of the flange 18 in the groove 26 of the disk by axial translation, when the solid portions 28 of the rim of the flange are in line with the hollow portions of the rim 40 of the groove 26. The flange 18 is then immobilized axially by rotation in the groove 26 of the disk until the solid portions 28 of the rim 24 of the flange are in line with the solid portions 42 of the rim 40 of the groove and pressing axially on these solid portions.

Figure 4:
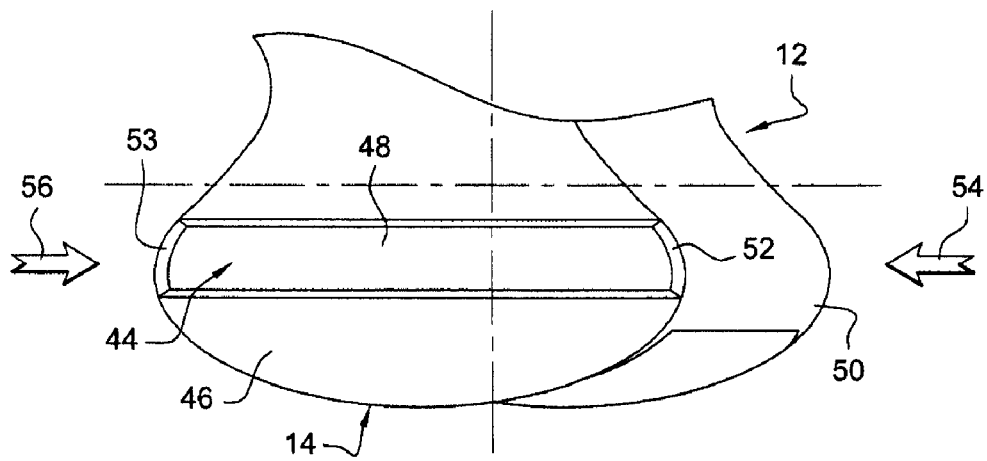
FIG. 4 is a partial schematic view in perspective of the root of a blade of the rotor disk of FIG. 1, seen from downstream.

The downstream flange 18 is prevented from rotating about the axis of the disk 10 by means of stops 44 formed on the downstream ends of the roots 14 of the blades and designed to nest with a slight circumferential clearance in the hollow portions 30 of the annular rim 24 of the flange 18 (FIGS. 1 and 4).

In a known embodiment, the stop 44 of each blade 12 is formed in protrusion on a downstream radial face 46 of the blade root 14 and has a parallelepipedal shape that is elongated in the circumferential direction and extends from one lateral edge to the other of the downstream face 46 of the root.

The stop 44 comprises a substantially radial downstream face 48 that is connected to the lateral faces 50 of the blade root 14 by faces 52, 53 designed to come into abutment in the circumferential direction on adjacent solid portions of the annular rim 24 of the flange in order to stop it rotating in the groove 26 of the disk. The faces 52, 53 may be in line with the lateral faces 50 of the blade root. The face 52 of the stop, situated on the right in the drawing, is designed to come into abutment on a solid portion 28 of the scalloped rim of the flange in order to stop the flange 18 rotating in one direction of rotation (arrow 54—to the left in the drawing) about the axis of the disk, and its face 53, situated on the left in the drawing, is designed to come into abutment on an adjacent solid portion 28 of the rim of the flange in order to stop it rotating in the opposite direction of rotation (arrow 56—to the right in the drawing) about the axis of the disk.

The invention makes it possible to lighten this type of blade thanks to a lesser thickness of the central portion of the stop. The "thickness" of the stop means the dimension of the stop in a direction parallel to the axis of the disk. The central portion of the stop has a slight or even zero thickness and the lateral ends of the stop that comprise the aforementioned abutment faces have a thickness that is substantially identical to that of the stop of the prior art.

Figure 5:
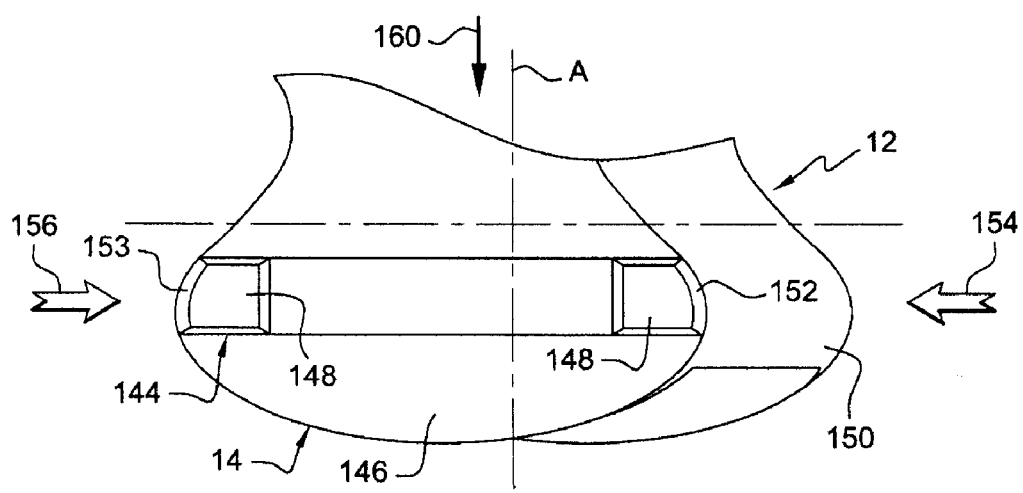
FIG. 5 is a partial schematic view in perspective of the root of a blade of a rotor disk according to the invention, seen from downstream.

In the exemplary embodiment of the invention shown in FIG. 5, the central portion of the stop 144 has been removed by machining, the lateral ends of the stop 144 being substantially identical and independent and at a circumferential distance from one another.

Each end of the stop 144 comprises a substantially radial downstream face 148 connected to the lateral face 150 of the nearest blade root via an abutment face 152, 153. The abutment face 152 of the stop 144, situated on the right in the drawing, makes it possible to lock the flange in the direction of rotation 154 about the axis of the disk, and the abutment face 153 of the stop 144, situated on the left in the drawing, makes it possible to lock the flange in the direction of rotation 156 about the axis of the disk.

The length and width of the stop according to the invention are substantially identical to those of the stop of the prior art. The "length" of the stop means the dimension of the stop in a circumferential direction relative to the axis of the disk, and the "width" of the stop means the dimension of the stop in a radial direction relative to this axis. The length of the central portion of the stop 144 is determined partly in order to significantly reduce the weight of the blade 12 and partly so that the ends of the stop retain a sufficient mechanical strength so as not to be damaged by butting against solid portions of the scalloped rim of the flange. Typically, the lightened or removed central portion of each stop has a length at least equal to approximately ¾ or ⅘ of the length of the stop.

The rotor disk according to the invention is assembled in the following manner:

The sectors of the flange 18 are mounted one after the other onto the downstream face of the disk 10 by axially aligning the solid portions 28 of the scalloped rim of the flange with the hollow portions of the scalloped rim 40 of the disk and by moving the sectors toward the disk, in a direction parallel to the axis of rotation of the disk, until the annular rim 24 of the flange is engaged in the groove 26 of the disk.

The sectors of the flange are then moved in rotation in the groove of the disk until the solid portions 28 of the annular rim of the flange are axially in line with the solid portions 42 of the rim of the groove 26 of the disk in order to axially immobilize the flange on the disk.

The blades 12 are mounted one after the other onto the disk by axially engaging their roots 14 from upstream in the channels 16 of the periphery of the disk, until the stops 144 of the blades are engaged in the hollow portions 30 of the scalloped rim of the flange and these stops are in line transversely with the solid portions 28 of the scalloped rim of the flange. The ring 20 is then compressed radially and engaged in the annular groove 22 of the upstream face of the disk in order to axially lock the blades 12 onto the disk.

The stop 144 according to the invention may be obtained by machining the root of a blade according to the prior art. For this, an appropriate tool is moved one or more times in a direction 160 substantially parallel to the longitudinal axis A of the blade on the central portion of the stop 144 in order to remove material by machining. The central portion of the stop may also be removed by ECM (Electrochemical Machining) or EDM (Electrical Discharge Machining).

As a variant, the stop 144 may be cast with the blade 12 or be fitted and attached to the blade root.

The invention claimed is:

1. A turbomachine rotor blade comprising a root having a stop formed in protrusion on one of its upstream and downstream end faces, wherein the central portion of this stop has a thickness in a direction substantially perpendicular to said end face that is less than that of the ends of the stop.

2. The blade as claimed in claim 1, wherein the central portion of each stop is lightened by the removal of material.

3. The blade as claimed in claim 1, wherein the central portion of each stop is removed by machining.

4. The blade as claimed in claim 2 or 3, wherein the lightened or removed central portion of each stop has a length in a direction substantially perpendicular to the longitudinal axis of the blade and parallel to said end face that is at least equal to approximately ¾ or ⅘ of that of the stop.

5. The blade as claimed in claim 1, wherein its root has a dovetail or dogtooth shape in cross section.

6. The blade as claimed in claim 1, wherein the stop is formed by machining or obtained by casting.

7. A turbomachine rotor disk, comprising blades as claimed in claim 1 whose roots are mounted in channels of the periphery of the disk, and an annular flange that is mounted coaxially on the disk and that presses on the roots of the blades, the stop of each blade root being engaged in a matching cavity of the flange in order to stop it rotating about the axis of the disk.

8. A turbomachine which comprises at least one rotor disk as claimed in claim 7.

* * * * *